No. 752,202. PATENTED FEB. 16, 1904.
I. D. CHRITTON.
BELT GUIDE.
APPLICATION FILED AUG. 5, 1903.
NO MODEL.
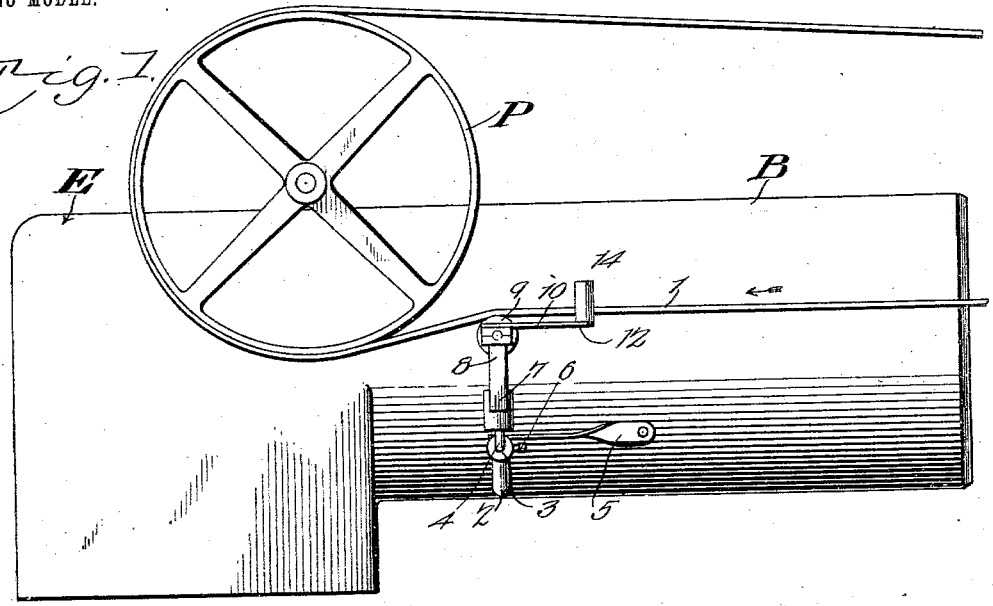
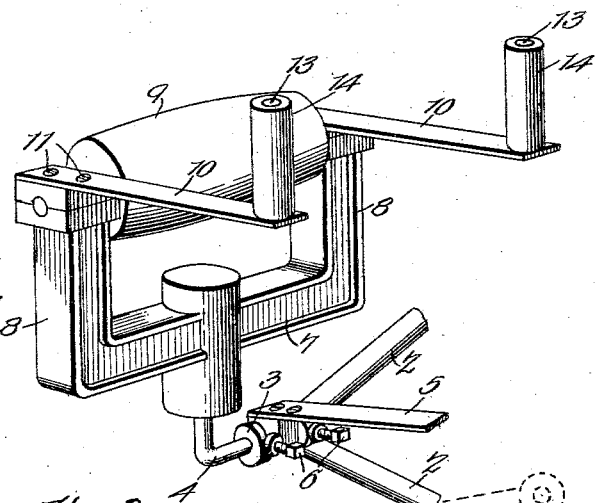
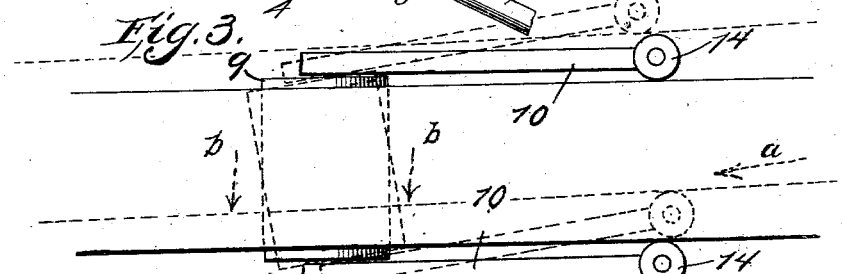
Witnesses
I. D. Chritton, Inventor,
by C. A. Snow & Co
Attorneys No. 752,202. Patented February 16, 1904.

UNITED STATES PATENT OFFICE.

ISAIAH D. CHRITTON, OF GRAVES, KANSAS.

BELT-GUIDE.

SPECIFICATION forming part of Letters Patent No. 752,202, dated February 16, 1904.

Application filed August 5, 1903. Serial No. 168,367. (No model.)

*To all whom it may concern:*

Be it known that I, ISAIAH D. CHRITTON, a citizen of the United States, residing at Graves, in the county of Cloud and State of Kansas, have invented a new and useful Belt-Guide, of which the following is a specification.

This invention relates to belt-guides, and has for its object to provide a belt-guide adapted to restore a belt to proper position upon a pulley when shifted laterally from any cause.

A special object is to provide an automatic belt-guide adapted for use with belts exposed to the action of side currents of air which tend to shift the belt laterally upon the pulleys, such belts, for example, as those used in driving threshing-machines or other forms of separators which are operated in the open air and are frequently subjected to strong winds which tend to blow belts off driving and driven pulleys.

In describing the invention reference will be had to the accompanying drawings, in which there is illustrated one form of embodiment of the invention shown in operative relation to a traction-engine, it being understood that various changes in the form and proportions of the elements exhibited, as well as in the mode of assemblance thereof, may be made without departing from the spirit of the invention or sacrificing any of its advantages.

In the drawings, Figure 1 is a view in side elevation of part of an engine with the belt-guide mounted thereon in operative relation to a belt. Fig. 2 is a perspective view of the belt-guide detached from the engine, showing the parts on a larger scale, the bracket members being broken away to save space. Fig. 3 is a plan view of a pulley with a belt traveling over it in an oblique direction to show the tendency of the pulley to shift the belt laterally.

Referring to the drawings in detail, B designates generally the boiler of the traction-engine E, and P designates the fly-wheel, which forms the driving-pulley over which travels a belt 1.

2 designates generally a bracket attached to the boiler of the engine and having at the free end thereof a tubular socket 3 for the rounded end of an angular supporting-arm 4.

The numeral 5 designates a brace arranged obliquely between the bracket 2 and the boiler B, and 6 6 are set-screws for clamping the supporting-arm 4 in any desired position within its socket.

The portion of the angular arm 4 which is secured within the socket 3 will be ordinarily held in a horizontal position, and the other end of the supporting-arm will be directed upward, as shown. Upon the vertical portion of the supporting-arm there is mounted, so as to turn freely thereon, a pulley-supporting frame 7, having the upwardly-projecting arms 8, provided at their tops with bearings for the shaft of a roller or pulley 9. Also mounted on the upper ends of the arms 8 are the spring-arms 10, which are secured in position by screws 11 or other suitable fastening means and are disposed at right angles to the axis of the pulley 9. The arms 10 are provided near their free ends with openings 12, in which may be secured shafts 13, bearing rolls 14, which are adapted to turn freely thereon.

The arms 10 will be so disposed with reference to the pulley-frame 7 that the belt 1 passing over the pulley will always travel from the rolls 14 toward the pulley 9 in order that the device may be effective in correcting lateral shifting of the belt upon the driving-pulley P.

When the parts are arranged in the position indicated in Fig. 1 and the belt is traveling in the direction indicated by the arrow adjacent thereto, any lateral movement of the belt under the influence of a side wind will produce a pivotal movement of the pulley-frame 7, disposing the pulley obliquely, as clearly shown in Fig. 3. This pivotal movement of the frame will be occasioned by the contact of one margin of the belt with one of the rollers 14 and will change the position of the belt upon the pulley 9 so that it will travel over the pulley in a direction which is oblique to the axis of the pulley instead of perpendicular thereto, as when the belt is in its normal position. Whenever the belt travels over the pulley in an oblique direction, as shown in Fig. 3, the frictional engagement of the belt with the pulley will always tend to cause the belt to move laterally upon the pulley toward the side which is disposed at an acute angle to the axis of the pulley, and consequently the travel of the belt over the pulley 9 when the belt has been shifted laterally will tend to restore the belt to its normal position. This action of the belt upon the pulley may be readily understood from Fig. 3 if it be assumed that the belt is traveling in the direction indicated by the arrow $a$. Then the tendency of the belt to move laterally on the pulley will be in the direction of the arrow $b\ b$. If the pulley be mounted in a frame of the character shown in Figs. 1 and 2 and arms 10 with suitable rollers at the ends be provided in connection therewith, the contact of one margin of the belt with one of the rollers carried by the arms 10 will cause the pivotal movement of the pulley-frame as the belt is shifted laterally on the surface of the pulley, owing to its oblique position thereon, and the movement of the frame upon its pivot will soon restore the pulley to its normal position in relation to the belt.

While I have shown the belt-guide in connection with an engine only, it is obvious that a guide similarly constructed may be used in connection with a thresher or other piece of machinery driven by the engine and that when a long belt is used it is desirable that a belt-guide be employed adjacent to the driving-pulley and to the driven pulley also.

In order to facilitate the placing of the pulley in position upon the belt-guide, the set-screws 6 are provided, and the supporting-arm 4 is adapted for rotation in the socket 3 when the set-screws are retracted. This construction permits the frame 7, in which the pulley 9 is supported, to be tilted to bring the ends of rolls 14 below the top of belt-pulley 9 to permit the belt to be placed in position upon the driving-pulley P before the belt-guide is raised into operative position. The downward movement of the pulley-supporting frame in order to bring the belt into position on the pulley will be necessary when the guide is used with a belt which is stretched taut; but when the belt is loose upon the pulleys and sags to some extent one of the spring-arms 10 of the guide may be depressed sufficiently to permit the belt to be passed over the top of the roller carried by the arm, and so brought into position above the pulley 9. The set-screws 6 also permit the adjustment of the arm 4, so that the frame 7 may be disposed at an inclination to the vertical, if so desired. Such inclination of the pulley-frame is effective in increasing the corrective effect of the belt-guide when the belt is shifted laterally, but is not necessary under ordinary circumstances.

A special advantage of the improved belt-guide is its adaptability for use with an engine and thresher when the surface of the ground is of such character that the engine and thresher cannot be placed with their belt-pulleys in alinement. When that condition exists, a belt-guide can be supplied upon the engine and upon the thresher, and the action of the guides will be effective in keeping the belt in proper position upon the driving-pulley of the engine and upon the driven pulley of the thresher. When guides are used under the conditions mentioned, it will be desirable to have provided at the ends of the bars 10, under the rolls 14, other rolls for engagement with a belt lying below the rolls shown in the drawings.

Having thus described the construction and use of my invention, what I claim as new, and desire to secure by Letters Patent, is—

1. A belt-guide comprising a pulley-frame mounted for pivotal movement in the plane of the axis of the pulley, a pulley mounted in said frame and adapted to accommodate a flat belt, and devices rigidly mounted on said frame to engage the edges of the belt passing over the pulley.

2. A belt-guide comprising a pulley-frame mounted for pivotal movement in the plane of the axis of the pulley, a pulley mounted in said frame, spring-arms rigidly secured upon said frame at right angles to the axis of said pulley, and rolls mounted on said arms for engagement with the edges of a belt traveling over said pulley.

3. A belt-guide comprising a suitable bracket, a pulley-frame pivotally mounted on said bracket, a pulley mounted in said frame and adapted to accommodate a flat belt, and members carried by said frame for engagement with the edges of the belt traveling over said pulley, said members being arranged to engage the belt at a distance from the line of contact with the pulley.

4. A belt-guide comprising a suitable bracket, an angular arm adjustably supported in said bracket, a pulley-supporting frame pivotally mounted on said angular arm, a pulley provided in said frame, and members carried by said frame for engagement with the sides of a belt traveling over said pulley.

5. A belt-guide comprising a bracket, an angular arm mounted in said bracket and susceptible of rotation therein, set-screws for clamping said arm in adjusted position, a pulley-frame pivotally mounted on the free end of said arm, a pulley carried by said frame, and members provided on said arm for engagement with the edges of a belt traveling over said pulley.

6. A belt-guide comprising a pulley-frame pivotally supported for movement in the plane of the axis of the pulley, a pulley supported in said frame, a pair of parallel spring-arms mounted on said frame and disposed substantially at right angles to the axis of the pulley, and a pair of rolls mounted on said arms and adapted for contact with the edges of the belt traveling over said pulley.

In testimony that I claim the foregoing as my own I have hereto affixed my signature in the presence of two witnesses.

ISAIAH D. CHRITTON.

Witnesses:
S. C. WHEELER,
C. C. GRIFFITH.